US012633281B2

(12) United States Patent
Marotta

(10) Patent No.: US 12,633,281 B2
(45) Date of Patent: May 19, 2026

(54) DEEP LEARNING ACTIVE SOUND DESIGN SYSTEM AND METHODS

(71) Applicants: Hyundai Motor Company, Seoul (KR); Kia Corporation, Seoul (KR)

(72) Inventor: Taylor Marotta, Irvine, CA (US)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 197 days.

(21) Appl. No.: 18/665,710

(22) Filed: May 16, 2024

(65) Prior Publication Data

US 2025/0356833 A1 Nov. 20, 2025

(51) Int. Cl.

| | |
|---|---|
| ***H04B 1/00*** | (2006.01) |
| ***G10K 15/02*** | (2006.01) |
| ***H04R 1/02*** | (2006.01) |
| *H04R 3/02* | (2006.01) |

(52) U.S. Cl.

CPC ............. *G10K 15/02* (2013.01); *H04R 1/025* (2013.01); *H04R 2499/13* (2013.01)

(58) Field of Classification Search

CPC ..... G10K 15/02; H04R 1/025; H04R 2499/13
USPC .................................................. 381/86, 73.1
See application file for complete search history.

(56) References Cited

U.S. PATENT DOCUMENTS

| | | | |
|---|---|---|---|
| 10,467,998 B2 | 11/2019 | Silverstein | |
| 2011/0040707 A1 | 2/2011 | Theisen et al. | |
| 2022/0314117 A1 | 10/2022 | Estanislao | |
| 2024/0212664 A1* | 6/2024 | Lee ........................ | G10K 15/02 |

* cited by examiner

*Primary Examiner* — Ammar T Hamid
(74) *Attorney, Agent, or Firm* — Fox Rothschild LLP

(57) ABSTRACT

Systems and methods for active sound design (ASD) generation are provided. The system may comprise one or more speakers and a computing device, comprising a processor and a memory. The memory may be configured to store instructions that, when executed by the processor, are configured to cause the processor to receive one or more inputs for synthetic sound generation, classify the one or more inputs as fast refresh rate inputs (FRRIs) or slow refresh rate inputs (SRRIs), assign one or more processing resources as a function of refresh rate, generate ASD based on the one or more inputs, and play the synthetic sound on the one or more speakers.

20 Claims, 6 Drawing Sheets

DEEP LEARNING ACTIVE SOUND DESIGN SYSTEM AND METHODS

BACKGROUND

Technical Field

Embodiments of the present disclosure relate to systems and methods for active sound design (ASD) generation.

BACKGROUND

Active sound design (ASD) has become a mandatory feature in many electric vehicles (EVs). As such, having ASD that stands out in the market is critical such that competitors are employing high profile talent and/or showcasing their unique technology. North American customers tend to want to customize vehicles to show personality and value personalized and customizable features.

Customers have expressed interest in being able to produce their own active sound designs. However, they are not aware of the associated skills and technical challenges inherent to accomplish this themselves. Additionally, customers want ASD to be responsive to current driving situations (i.e., to have no lag). However, increasing the responsiveness of ASD increases the required computing load, and an increased computing load increases cost.

SUMMARY

According to an object of the present disclosure, a system for active sound design (ASD) generation is provided. The system may comprise one or more speakers and a computing device, comprising a processor and memory. The memory may be configured to store instructions that, when executed by the processor, are configured to cause the processor to receive one or more inputs for synthetic sound generation, classify the one or more inputs as fast refresh rate inputs (FRRIs) or slow refresh rate inputs (SRRIs), and assign one or more processing resources as a function of refresh rate. The instructions, when executed by the processor, may be configured to cause the processor to generate ASD based on the one or more inputs, wherein the generating comprises using the SSRIs to change one or more weights of a deep learning model to be used with one or more prompts, using the deep learning model, processing the weights and prompts to output one or more looping sound files to a stem library, forming one or more stems, using the FRRIs to change one or more dynamics of a wave synthesis ASD module, and generating, using the one or more stems and the wave synthesis ASD module, a synthetic sound. The prompts may comprise inputs into the deep learning model. The instructions, when executed by the processor, may be configured to cause the processor to play the synthetic sound on the one or more speakers.

According to an exemplary embodiment, the FRRIs may comprise one or more inputs selected from the group consisting of: throttle position; motor speed; wheel speed; brake position; vehicle g-forces; and motor load.

According to an exemplary embodiment, the SRRIs may comprise one or more inputs selected from the group consisting of: time of day; one or more calendar dates; location; drive mode; weather, traffic conditions; aggressiveness; complexity; musicality; one or more stored personal model weights; one or more shared model weights; and user ASD history.

According to an exemplary embodiment, the deep learning model may comprise a diffusion model.

According to an exemplary embodiment, the prompts may be defined by how the deep learning model is built and trained.

According to an exemplary embodiment, the synthetic sound may be a synthetic powertrain sound.

According to an exemplary embodiment, the system may comprise a vehicle.

According to an exemplary embodiment, the one or more speakers may be coupled to the vehicle.

According to an exemplary embodiment, the one or more stems may be manipulated by one or more ASD dynamic curves.

According to an exemplary embodiment, each stem, of the one or more stems, may comprise multiple ASD dynamic curves for each FRRI.

According to an exemplary embodiment, the instructions, when executed by the processor, may be configured to cause the processor to enable a first user to share one or more stems of a first stem library with a second user.

According to an object of the present disclosure, a method for ASD generation is provided. The method may comprise receiving one or more inputs for synthetic sound generation, classifying the one or more inputs as FRRIs or SRRIs. FFRIs may be assigned to a direct operation of the wave synthesis ASD module as an almost instantaneous reaction to these inputs is critical for driver dynamic feel. SRRIs may be assigned to the input weights of the trained deep learning model. This model may be configured to generate stems, as looped sound files, for the stem library as appropriate processing power and memory is made available. The generation of new stems is not critical to driver dynamic feel, thus they may be generated at a slower rate than the output of the wave synthesis module. The ASD module, using the stems in the stem library and the FRRIs, may be configured to output a synthetic sound. The method may comprise playing the synthetic sound on one or more speakers.

According to an exemplary embodiment, the FRRIs may comprise one or more inputs selected from the group consisting of: throttle position; motor speed; wheel speed; brake position; vehicle g-forces; and motor load.

According to an exemplary embodiment, the SRRIs may comprise one or more inputs selected from the group consisting of: time of day; one or more calendar dates; location; drive mode; weather, aggressiveness; complexity; musicality; one or more stored personal model weights; one or more shared model weights; b bgand user ASD history.

According to an exemplary embodiment, the deep learning model may comprise a diffusion model.

According to an exemplary embodiment, the prompts may be defined by how the deep learning model is built and trained.

According to an exemplary embodiment, the synthetic sound may be a synthetic powertrain sound.

According to an exemplary embodiment, the one or more speakers may be coupled to a vehicle.

According to an exemplary embodiment, the method may comprise manipulating the one or more stems by one or more ASD dynamic curves.

According to an exemplary embodiment, each stem, of the one or more stems, may comprise multiple ASD dynamic curves for each FRRI.

According to an exemplary embodiment, the method may comprise enabling a first user to share one or more stems of a first stem library with a second user.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
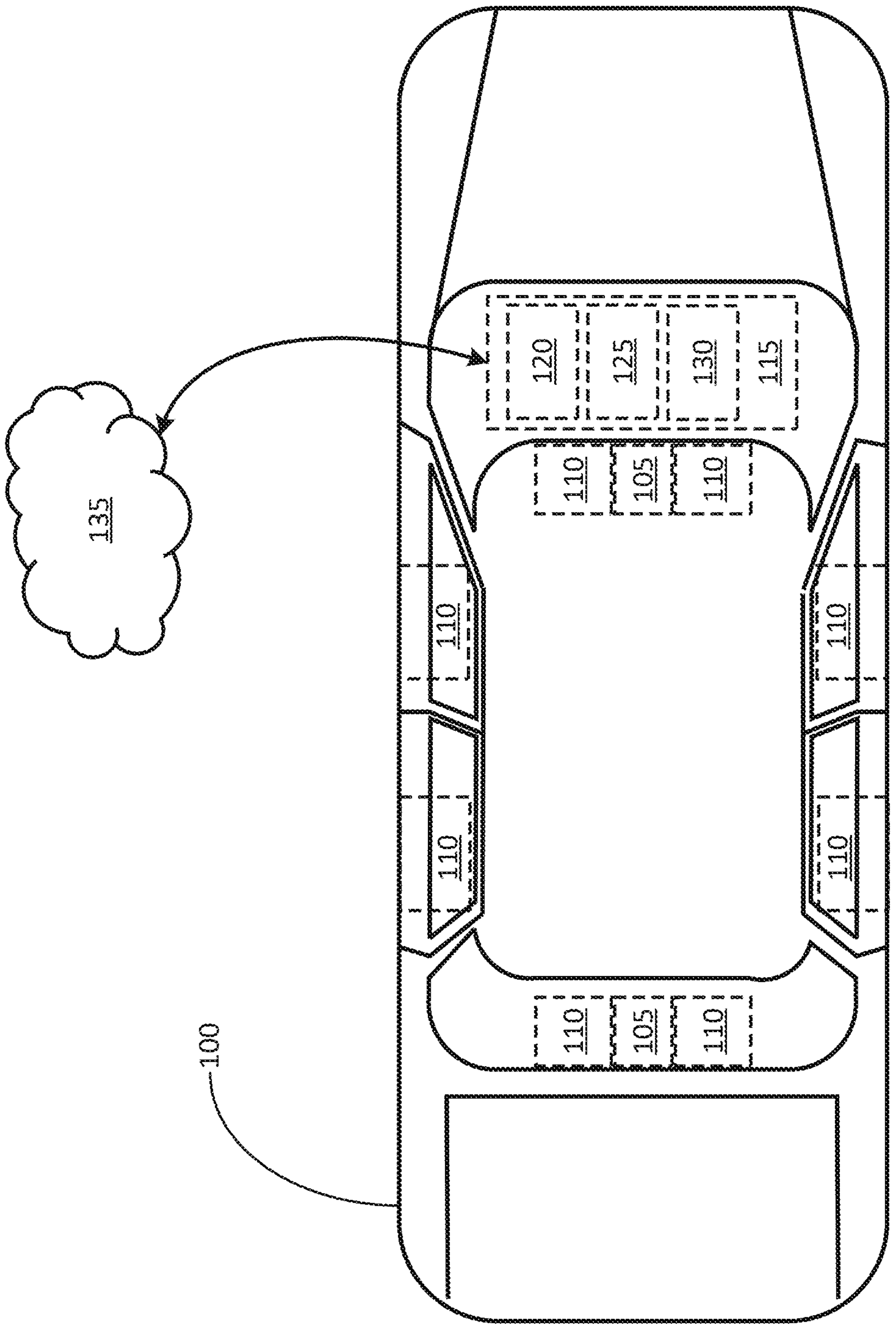
FIG. 1 illustrates a vehicle configured for active sound design (ASD) generation, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term “about” is understood as within a range of normal tolerance in the art, for example within 2 standard deviations of the mean. “About” can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term “about”.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term “processor,” as used herein may refer to any of the foregoing structures or any other structure suitable for implementation of the techniques described herein. As employed in the subject specification, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a “chip,” a “package,” an Integrated Circuit (IC).

According to exemplary embodiments, systems and methods for active sound design (ASD) generation are provided.

Referring now to FIG. 1, a vehicle 100 configured for ASD generation is illustratively depicted, in accordance with an exemplary embodiment of the present disclosure. According to an exemplary embodiment, the vehicle 100 may comprise an EV.

According to an exemplary embodiment, the vehicle 100 may comprise one or more sensors such as, for example, one or more microphones 105 configured to detect and/or record sounds. According to an exemplary embodiment, the vehicle 100 may comprise one or more speakers configured to play one or more sounds. According to an exemplary embodiment, the vehicle 100 may comprise a computing device 115. The computing device 115 may comprise a processor 120, a memory 125, and/or a user interface 130 (e.g., a graphical user interface). The computing device 130 may be configured to send and/or receive commands/data/etc. via one or more external systems via wired and/or wireless connection (e.g., via the cloud 135).

According to an exemplary embodiment, the one or more microphones 105 and/or the one or more speakers 110 may be in electronic communication with the one or more computing devices 115. The one or more computing devices 115 may be separate from the one or more microphones 105 and/or the one or more speakers 110 and/or may be incorporated into the one or more microphones 105 and/or the one or more speakers 110.

The memory 125 may be configured to store programming instructions that, when executed by the processor 120, may be configured to cause the processor 120 to perform one or more tasks such as, e.g., receiving one or more inputs from one or more microphones 110 and/or the user interface 130, performing ASD generation using deep learning, and/or perform other suitable tasks.

Figure 2:
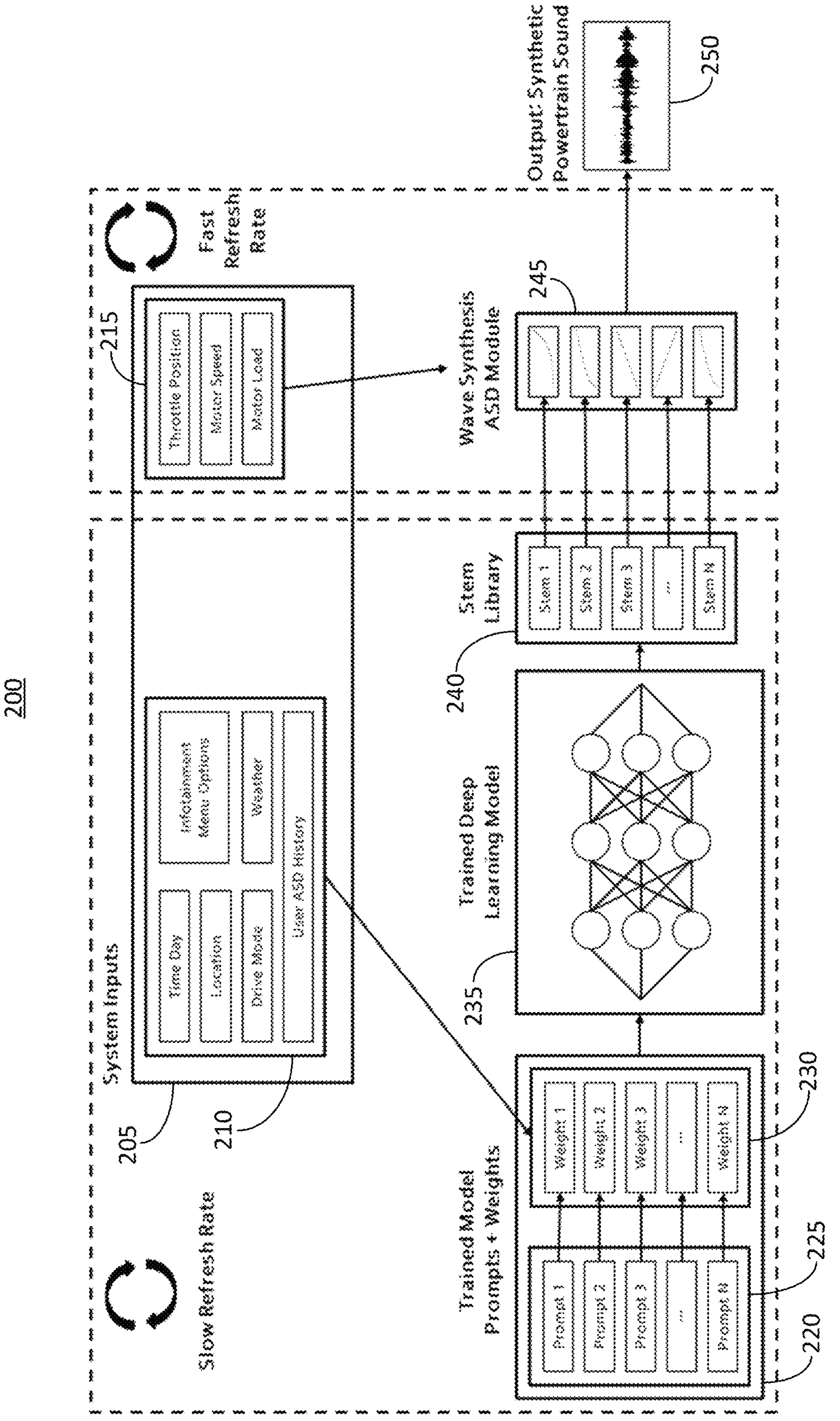
FIG. 2 illustrates a process for incorporating a deep learning system with an ASD system of a vehicle, according to an exemplary embodiment of the present disclosure.

Referring now to FIG. 2, a process 200 for incorporating a deep learning system with an ASD system of a vehicle (e.g., vehicle 100), in accordance with an exemplary embodiment of the present disclosure.

According to an exemplary embodiment, systems of the present disclosure (e.g., vehicle 100) separately process critical inputs for fast response time and slowly changing passive, or user-manually directed, inputs in order to greatly reduce required computational resources for an artificial intelligence (AI)-controlled system.

According to an exemplary embodiment, the inputs to the system (e.g., system inputs 205) may be almost any dynamic variable (driver initiated or passive). According to an exemplary embodiment, the system inputs 205 may comprise slow refresh rate inputs 210 (e.g., time of day, one or more calendar dates (e.g., one or more nearby calendar dates), location, drive mode, weather, traffic conditions, aggressiveness, complexity, musicality, one or more stored personal and/or shared model weights, and user ASD history, among other suitable slow refresh rate inputs) and fast refresh rate inputs 215 (e.g., motor conditions such as, e.g., throttle position, motor speed, motor load, wheel speed, brake position, and vehicle g-forces, among other suitable fast refresh rate inputs).

An ASD requires an almost instantaneous reaction time or perceptively instantaneous reaction time to motor related inputs in order for it to sound pleasing to driver. These inputs are categorized as the fast refresh rate inputs (FRRIs) 215. All other inputs not critical for an ASD reaction are categorized as the slow refresh rate inputs (SRRIs) 210.

According to an exemplary embodiment, the SRRIs 210 may be configured to change weights 230 of a deep learning model 235, and the FRRIs 210 may be configured to change dynamics of the ASD's wave synthesis stems via a wave synthesis ASD module 245.

According to an exemplary embodiment, the trained model prompts and weights 220 may have lower processing priority. The prompts 225 are the inputs to the deep learning model 235. According to an exemplary embodiment, the SRRIs 210 may be used to determine the value of the weights 230 to those prompts 225.

The prompts 225 may be defined by how the deep learning model 235 is built and trained. Examples may be aggressiveness, calming, loud, metallic, etc., and may be determined by a designer (e.g., a user) to best fit the designer's desired sound experience.

According to an exemplary embodiment, the trained deep learning model 235 may have lower processing priority. According to an exemplary embodiment, the deep learning model 235 may be an AI algorithm that is configured to process the weights 230 of the prompts 225 and output one or more looping sound files for a stem library 240.

According to an exemplary embodiment, a diffusion model is a preferred deep learning model 235. It is noted, however, that other suitable deep learning models 235 may be incorporated while maintaining the spirit and functionality of the present disclosure. Using a diffusion model, by applying denoising to already created stems or a preloaded library, the results of the model may be more nuanced and more controlled by design. A diffusion model may also be more conducive to allowing users to share or download "tunings."

According to an exemplary embodiment, the stem library 240 may have lower processing priority. According to an exemplary embodiment, the stem library 240 may comprise a collection of sounds that are manipulated by one or more ASD dynamic curves. According to an exemplary embodiment, the wave synthesis ASD module 245 may have higher processing priority. According to an exemplary embodiment, the system may be configured to assign one or more processing resources as a function of refresh rate, with the lower processing priority assigned to SRRIs and higher processing priority assigned to FRRIs.

The ASD is of the wave synthesis type, thus requiring the stem library 240.

According to an exemplary embodiment, the FRRIs 215 may be configured to determine the stems' 240 dynamic gain and filter values like they would in a traditional ASD. According to an exemplary embodiment, each stem of the stem library 240 may comprise multiple curves for each FRRI 215.

According to an exemplary embodiment, the wave synthesis ASD module 245 may be configured to output a synthetic powertrain sound 250 and/or other suitable sound.

Figure 3:
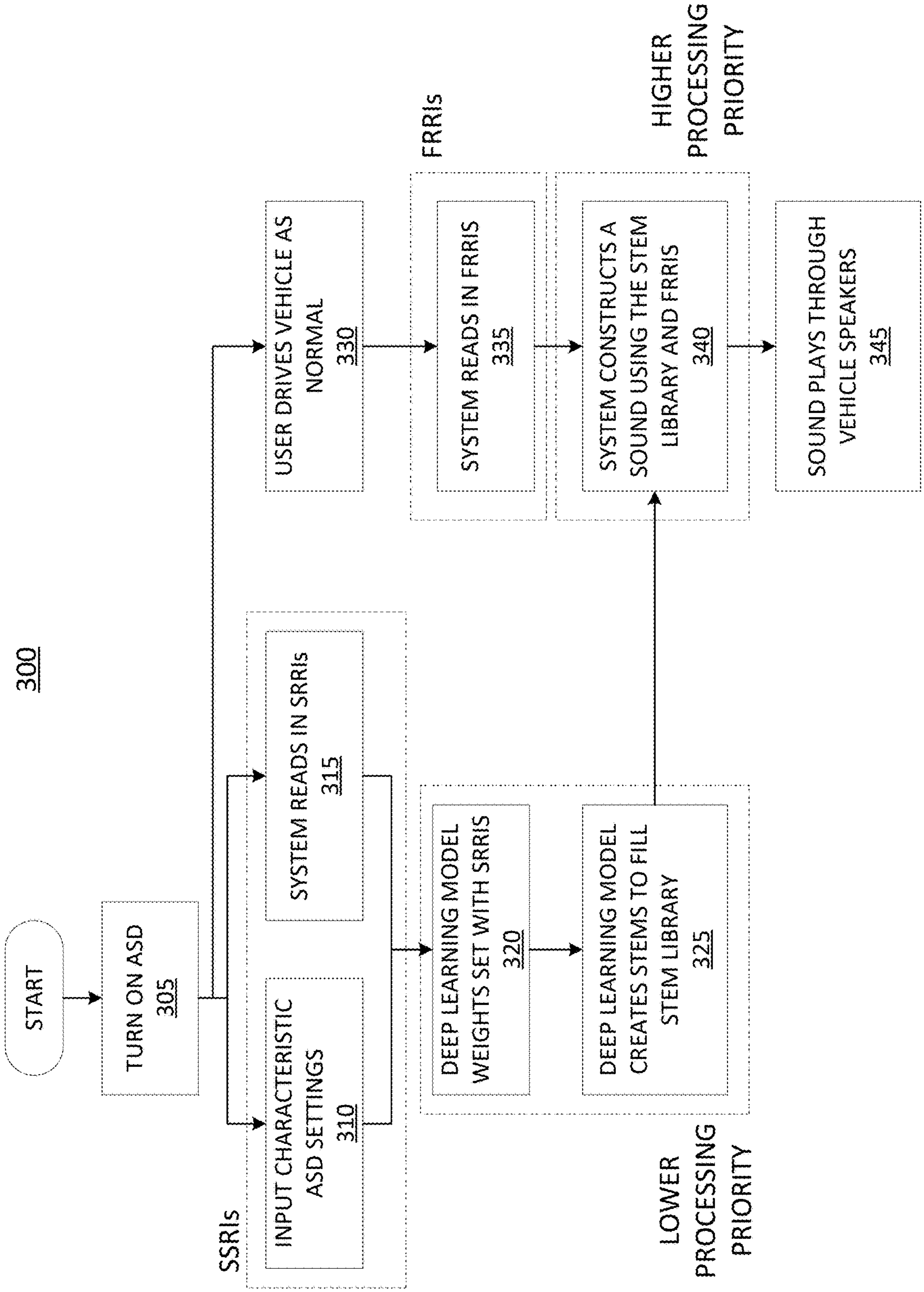
FIG. 3 illustrates a flowchart of a method for ASD generation, according to an exemplary embodiment of the present disclosure.

Referring now to FIG. 3, a method 300 for ASD generation is illustratively depicted, in accordance with an exemplary embodiment of the present disclosure.

At 310, a user may directly input one or more characteristic ASD settings using a user interface (e.g., a vehicle infotainment system), and, at 315, the system may read in one or more SRRIs.

At 320, the weights of the deep learning model may be set with the one or more SRRIs and, at 325, the deep learning model may be configured to create/generate one or more stems to fill the stem library. It is noted that, according to an exemplary embodiment, the deep learning model may be configured to create stems even though the user has not turned on the ASD. According to an exemplary embodiment, steps 320 and/or 325 may have lower processing priority. According to an exemplary embodiment, the one or more stems may comprise one or more looped sound files. According to an exemplary embodiment, the deep learning model may be configured to generate stems for the stem library as appropriate processing power and memory is made available. The generation of new stems is not critical to driver dynamic feel, thus the new stems may be generated at a slower rate than the output of the wave synthesis module.

At 305, according to an exemplary embodiment, a user may turn on the ASD. At 330, after the user turns on the ASD, the user may drive a vehicle as normal and, at 335, the system may read in one or more FRRIs.

According to an exemplary embodiment, using the stems of the stem library and the FRRIs, the system, at 340, may construct a sound (e.g., a synthetic powertrain sound and/or other suitable sound. The sound may then, at 345, be played through the one or more speakers of the vehicle. According to an exemplary embodiment, step 340 may have higher processing priority.

According to an exemplary embodiment, the systems of the present disclosure may comprise linked systems for users to share their stem libraries with a deep learning diffusion model's hidden prompts. This will add a social component to the system and allow customers to feel ownership over their sounds.

Figure 4:
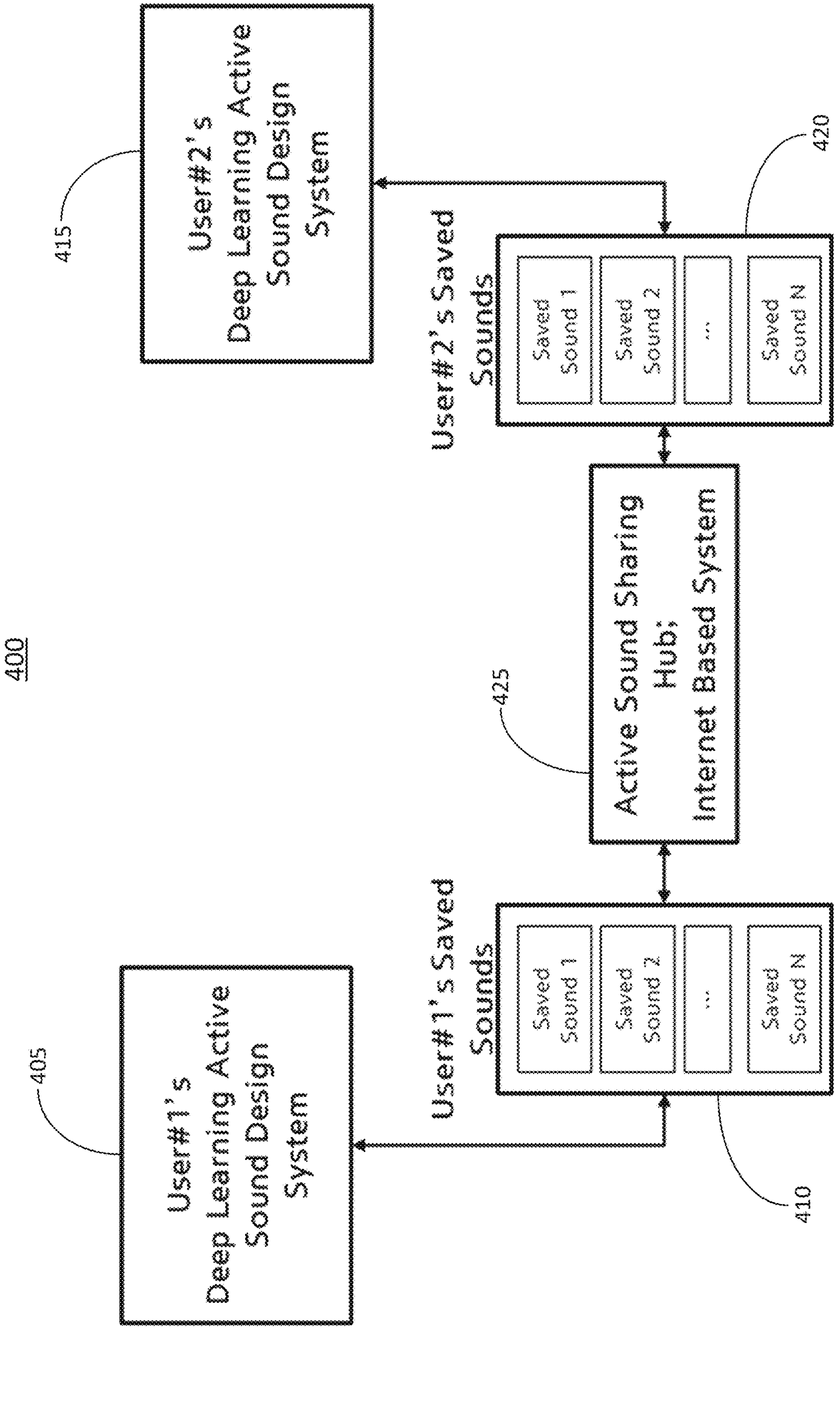
FIG. 4 illustrates a process for active sound sharing, according to an exemplary embodiment of the present disclosure.

For example, as shown in FIG. 4, a process 400 for active sound sharing is illustratively depicted, in accordance with an exemplary embodiment of the present disclosure.

According to an exemplary embodiment, a software system may be provided that synthetically produces a time based series of FRRIs to produce a demo of a user's generated sounds. This would allow the user to showcase their powertrain sounds to other users before the user decides to upload it to their our vehicle.

For example, a first user (User #1) may use a deep learning ASD system 405 to generate one or more saved sounds 410, and a second user (User #2) may use a deep learning ASD system 415 to generate one or more saved sounds 420. The system may be configured to enable the users to share sounds via, e.g., an active sound sharing hub 425. According to an exemplary embodiment, the active sound sharing hub 425 may be an Internet-based system and/or other suitable system.

According to an exemplary embodiment, the saved sounds and/or shared sounds may comprise a stem library, model prompts and weights, and/or a sound seed.

According to an exemplary embodiment, the active sound sharing hub 425 may be configured to facilitate usage of a sound sharing social system and/or enable one or more users to rate shared sounds. According to an exemplary embodiment, rating a shared sound may increase the visibility of the rated sound in the sound sharing social system. This will allow users to find the best sounds.

According to an exemplary embodiment, the system may be configured to enable a user to save their sound libraries and machine learning diffusion model's input. According to an exemplary embodiment, the system may be configured to enable the user to use their favorite saved powertrain sounds to be used as a base to create one or more new sounds.

Figure 5:
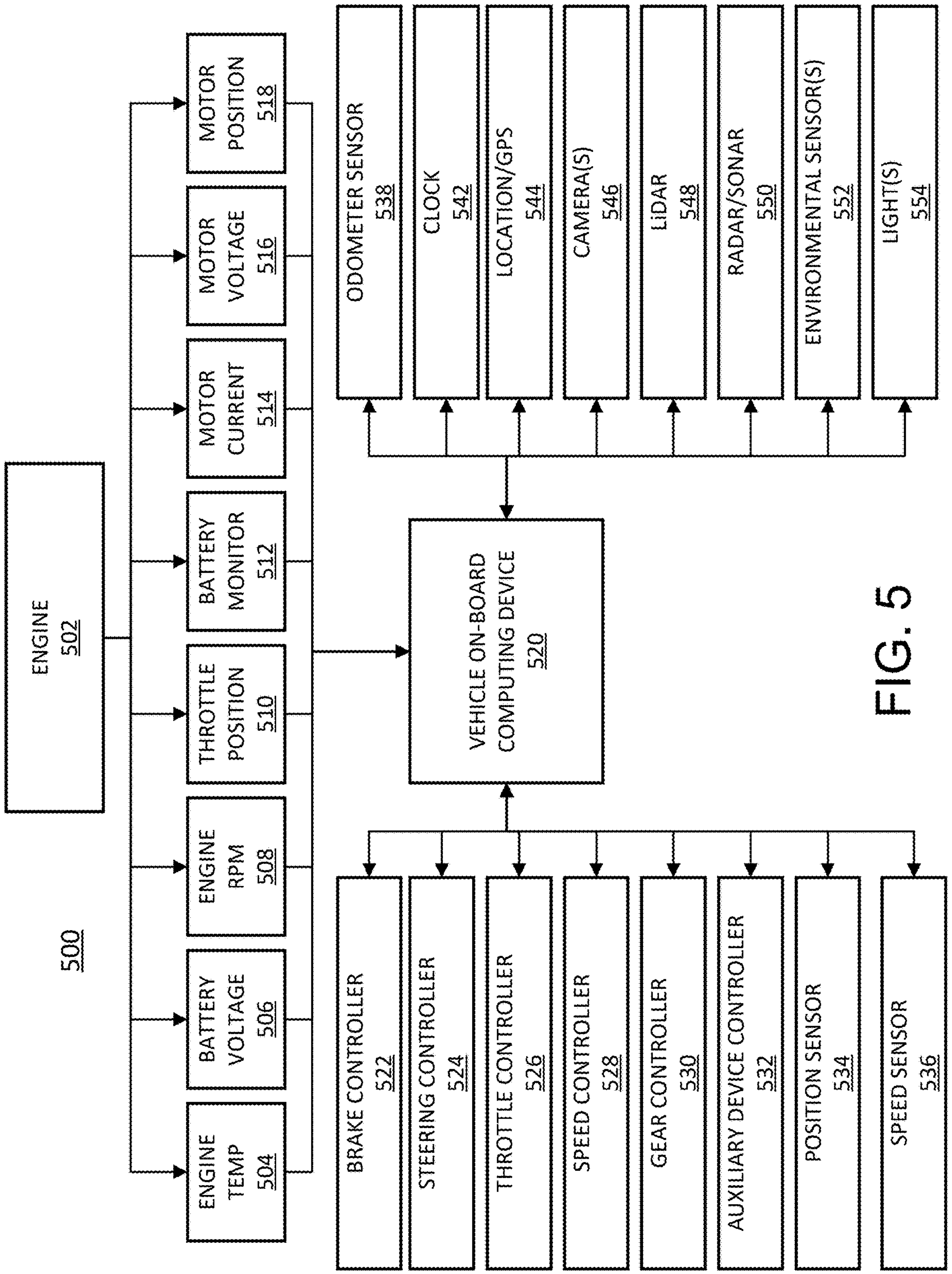
FIG. 5 illustrates an example architecture of a vehicle, according to an exemplary embodiment of the present disclosure.

Referring now to FIG. 5, an example vehicle system architecture 500 for a vehicle is provided, in accordance with an exemplary embodiment of the present disclosure. The following discussion of vehicle system architecture 500 is sufficient for understanding one or more components of vehicle 100.

As shown in FIG. 5, the vehicle system architecture 500 may comprise an engine, motor or propulsive device 502 and various sensors 504-518 for measuring various parameters of the vehicle system architecture 500. In gas-powered or hybrid vehicles having a fuel-powered engine, the sensors 504-518 may comprise, for example, an engine temperature sensor 504, a battery voltage sensor 506, an engine Rotations Per Minute (RPM) sensor 508, and/or a throttle position sensor 510. If the vehicle is an electric or hybrid vehicle, then the vehicle may comprise an electric motor, and accordingly may comprise sensors such as a battery monitoring system 512 (to measure current, voltage and/or temperature of the battery), motor current 514 and voltage 516 sensors, and motor position sensors such as resolvers and encoders 518.

Operational parameter sensors that are common to both types of vehicles may comprise, for example: a position sensor 534 such as an accelerometer, gyroscope and/or inertial measurement unit; a speed sensor 536; and/or an odometer sensor 538. The vehicle system architecture 500 also may comprise a clock 542 that the system uses to determine vehicle time and/or date during operation. The clock 542 may be encoded into the vehicle on-board computing device 520, it may be a separate device, or multiple clocks may be available.

The vehicle system architecture 500 may comprise various sensors that operate to gather information about the environment in which the vehicle is traveling. These sensors may comprise, for example: a location sensor 544 (for example, a Global Positioning System (GPS) device); object detection sensors such as one or more cameras 546; a LiDAR sensor system 548; and/or a radar and/or a sonar system 550. The sensors may comprise environmental sensors 552 such as, e.g., a humidity sensor, a precipitation sensor, a light sensor, and/or ambient temperature sensor. The object detection sensors may be configured to enable the vehicle system architecture 500 to detect objects that are within a given distance range of the vehicle in any direction, while the environmental sensors 552 may be configured to collect data about environmental conditions within the vehicle's area of travel. According to an exemplary embodiment, the vehicle system architecture 500 may comprise one or more lights 554 (e.g., headlights, flood lights, flashlights, etc.).

During operations, information may be communicated from the sensors to an on-board computing device 520 (e.g., computing device 115, computing device 600). The on-board computing device 520 may be configured to analyze the data captured by the sensors and/or data received from data providers and may be configured to optionally control operations of the vehicle system architecture 500 based on results of the analysis. For example, the on-board computing device 520 may be configured to control: braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers. The brake controller 522 may comprise a pedal effort sensor, pedal effort sensor, and/or simulator temperature sensor, as described herein.

Geographic location information may be communicated from the location sensor 544 to the on-board computing device 520, which may then access a map of the environment that corresponds to the location information to determine known fixed features of the environment such as streets, buildings, stop signs and/or stop/go signals. Captured images from the cameras 546 and/or object detection information captured from sensors such as LiDAR 548 may be communicated from those sensors to the on-board computing device 520. The object detection information and/or captured images may be processed by the on-board computing device 520 to detect objects in proximity to the vehicle. Any known or to be known technique for making an object detection based on sensor data and/or captured images may be used in the embodiments disclosed in this document.

Figure 6:
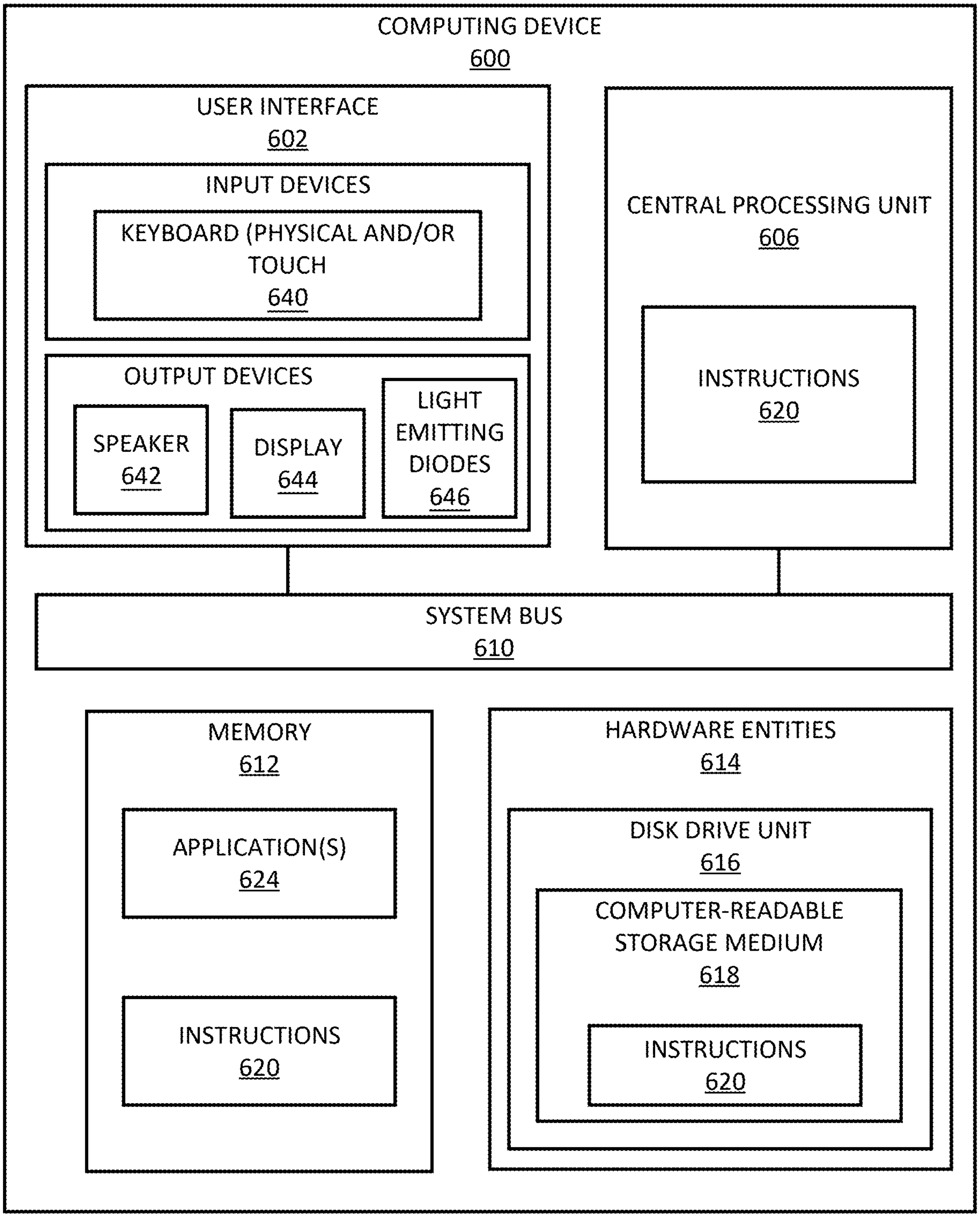
FIG. 6 illustrates example elements of a computing device, according to an exemplary embodiment of the present disclosure.

Referring now to FIG. 6, an illustration of an example architecture for a computing device 600 is provided. According to an exemplary embodiment, one or more functions of the present disclosure may be implemented by a computing device such as, e.g., computing device 600 or a computing device similar to computing device 600. Computing device 600 may be a quantum computer, a classical computer, and/or have one or more components configured to perform one or more quantum and/or classical computing functions. Computing device 115 and/or computing device 520 may be an example of computing device 600 and/or may comprise one or more components of computing device 600.

The hardware architecture of FIG. 6 represents one example implementation of a representative computing device configured to implement at least a portion of the systems/devices (e.g., vehicle 100) and method(s)/control logic(s) (e.g., process 200, method 300, and process 400) described herein.

Some or all components of the computing device 600 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 6, the computing device 600 may comprise a user interface 602 (e.g., a graphical user interface), a Central Processing Unit ("CPU")606, a system bus 610, a memory 612 connected to and accessible by other portions of computing device 600 through system bus 610, and hardware entities 614 connected to system bus 610. The user interface may comprise input devices and output devices, which may be configured to facilitate user-software interactions for controlling operations of the computing device 600. The input devices may comprise, but are not limited to, a physical and/or touch keyboard 640. The input devices may be connected to the computing device 600 via a wired or wireless connection (e.g., a Bluetooth® connection). The output devices may comprise, but are not limited to, a speaker 642, a display 644, and/or light emitting diodes 646.

At least some of the hardware entities 614 may be configured to perform actions involving access to and use of memory 612, which may be a Random Access Memory (RAM), a disk driver and/or a Compact Disc Read Only Memory (CD-ROM), among other suitable memory types. Hardware entities 614 may comprise a disk drive unit 616 comprising a computer-readable storage medium 618 on which may be stored one or more sets of instructions 620 (e.g., programming instructions such as, but not limited to, software code) configured to implement one or more of the methodologies, procedures, or functions described herein. The instructions 620 may also reside, completely or at least partially, within the memory 612 and/or within the CPU 606 during execution thereof by the computing device 600.

The memory 612 and the CPU 606 may also constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding, or carrying a set of instructions 620 for execution by the computing device 600 and that cause the computing device 600 to perform any one or more of the methodologies of the present disclosure. According to various embodiments, one or more computer applications 624 may be stored on the memory 612.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A system for active sound design (ASD) generation, comprising:

one or more speakers; and a computing device, comprising a processor and a memory, wherein the memory is configured to store instructions that, when executed by the processor, are configured to cause the processor to:

receive one or more inputs for synthetic sound generation;

classify the one or more inputs as fast refresh rate inputs (FRRIs) or slow refresh rate inputs (SRRIs);

assign one or more processing resources as a function of refresh rate, wherein:

lower processing priority is assigned to SRRIs, and higher processing priority is assigned to FRRIs;

generate ASD based on the one or more inputs, wherein the generating comprises:

using the SSRIs to change one or more weights of a deep learning model to be used with one or more prompts, wherein the prompts are inputs into the deep learning model;

using the deep learning model, processing the weights and prompts to output one or more looping sound files to a stem library, forming one or more stems;

using the FRRIs to change one or more dynamics of a wave synthesis ASD module; and generating, using the one or more stems and the wave synthesis ASD module, a synthetic sound; and play the synthetic sound on the one or more speakers.

2. The system of claim 1, wherein the FRRIs comprise one or more inputs selected from the group consisting of:

throttle position;

motor speed;

wheel speed;

brake position;

vehicle g-forces; and motor load.

3. The system of claim 1, wherein the SRRIs comprise one or more inputs selected from the group consisting of:

time of day;

one or more calendar dates;

location;

drive mode;

weather;

traffic conditions;

aggressiveness;

complexity;

musicality;

one or more stored personal model weights;

one or more shared model weights; and user ASD history.

4. The system of claim 1, wherein the deep learning model comprises a diffusion model.

5. The system of claim 1, wherein the prompts are defined by how the deep learning model is built and trained.

6. The system of claim 1, wherein the synthetic sound is a synthetic powertrain sound.

7. The system of claim 1, further comprising a vehicle, wherein the one or more speakers are coupled to the vehicle.

8. The system of claim 1, wherein the one or more stems are manipulated by one or more ASD dynamic curves.

9. The system of claim 8, wherein each stem, of the one or more stems, comprises multiple ASD dynamic curves for each FRRI.

10. The system of claim 1, wherein the instructions, when executed by the processor, are further configured to cause the processor to enable a first user to share one or more stems of a first stem library with a second user.

11. A method for active sound design (ASD) generation, comprising:

receiving one or more inputs for synthetic sound generation;

classifying the one or more inputs as fast refresh rate inputs (FRRIs) or slow refresh rate inputs (SRRIs);

assigning one or more processing resources as a function of refresh rate, wherein:

lower processing priority is assigned to SRRIs, and higher processing priority is assigned to FRRIs; and using a computing device comprising a processor and a memory, generating ASD based on the one or more inputs, wherein the generating comprises:

using the SSRIs to change one or more weights of a deep learning model to be used with one or more prompts, wherein the prompts are inputs into the deep learning model;

using the deep learning model, processing the weights and prompts to output one or more looping sound files to a stem library, forming one or more stems;

using the FRRIs to change one or more dynamics of a wave synthesis ASD module; and generating, using the one or more stems and the wave synthesis ASD module, a synthetic sound; and playing the synthetic sound on one or more speakers.

12. The method of claim 11, wherein the FRRIs comprise one or more inputs selected from the group consisting of:

throttle position;

motor speed;

wheel speed;

brake position;

vehicle g-forces; and motor load.

13. The method of claim 11, wherein the SRRIs comprise one or more inputs selected from the group consisting of:

time of day;

one or more calendar dates;

location;

drive mode;

weather;

traffic conditions;

aggressiveness;

complexity;

musicality;

one or more stored personal model weights;

one or more shared model weights; and user ASD history.

14. The method of claim 11, wherein the deep learning model comprises a diffusion model.

15. The method of claim 11, wherein the prompts are defined by how the deep learning model is built and trained.

16. The method of claim 11, wherein the synthetic sound is a synthetic powertrain sound.

17. The method of claim 11, wherein the one or more speakers are coupled to a vehicle.

18. The method of claim 11, further comprising manipulating the one or more stems by one or more ASD dynamic curves.

19. The method of claim 18, wherein each stem, of the one or more stems, comprises multiple ASD dynamic curves for each FRRI.

20. The method of claim 11, further comprising enabling a first user to share one or more stems of a first stem library with a second user.

* * * * *